Sept. 20, 1971  O. W. BYERS  3,606,090
DEVICE FOR DISPENSING MATERIAL FROM A TUBE
Filed July 2, 1969  2 Sheets-Sheet 1
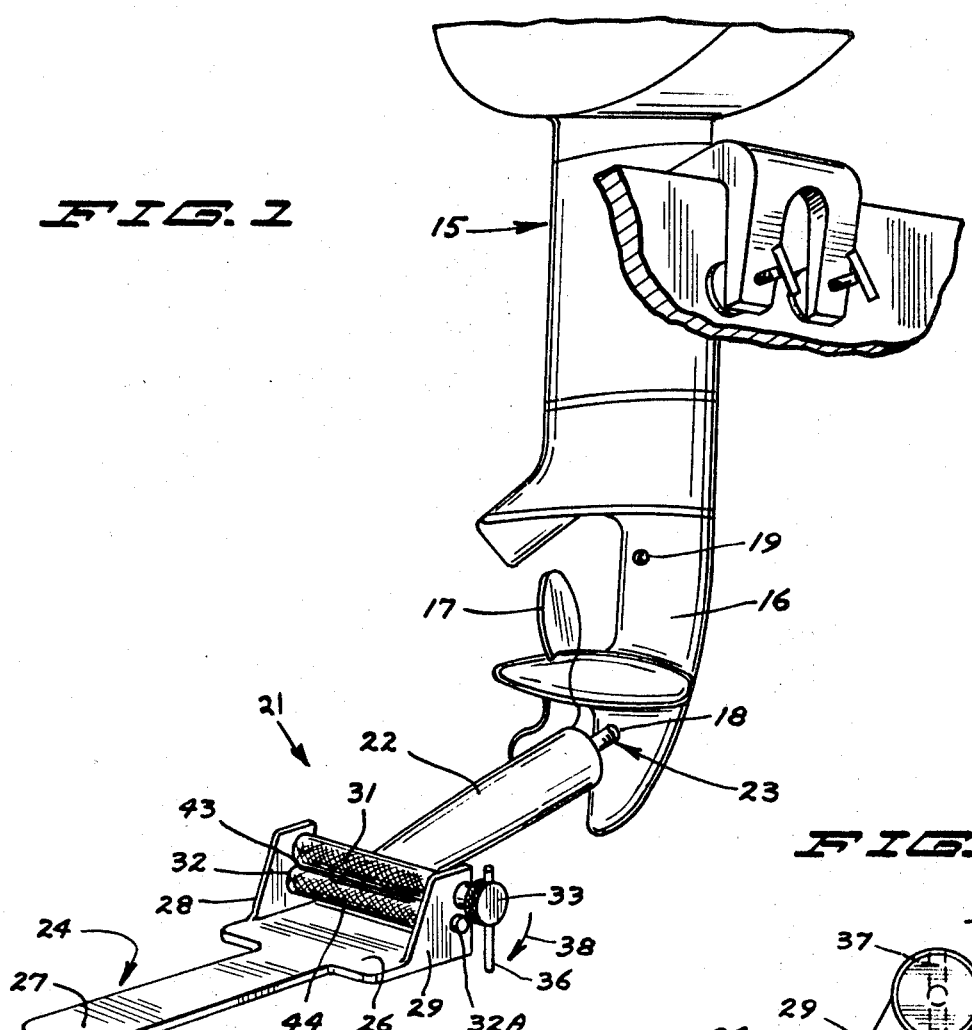
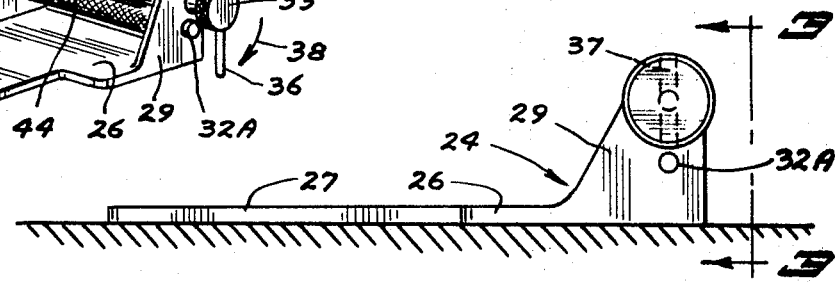
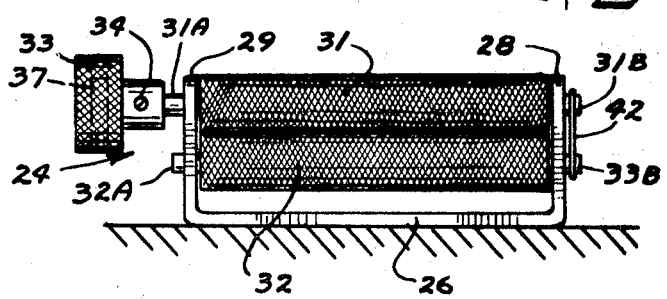
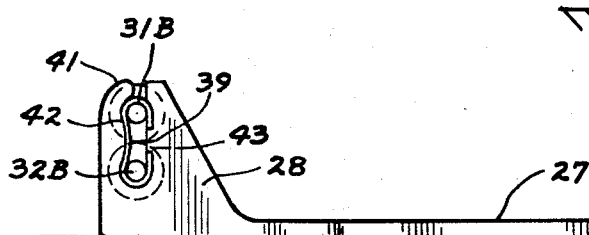
INVENTOR.
ORVA W. BYERS
BY
Burd Braddock & Bartz
ATTORNEYS Sept. 20, 1971  O. W. BYERS  3,606,090
DEVICE FOR DISPENSING MATERIAL FROM A TUBE
Filed July 2, 1969  2 Sheets-Sheet 2
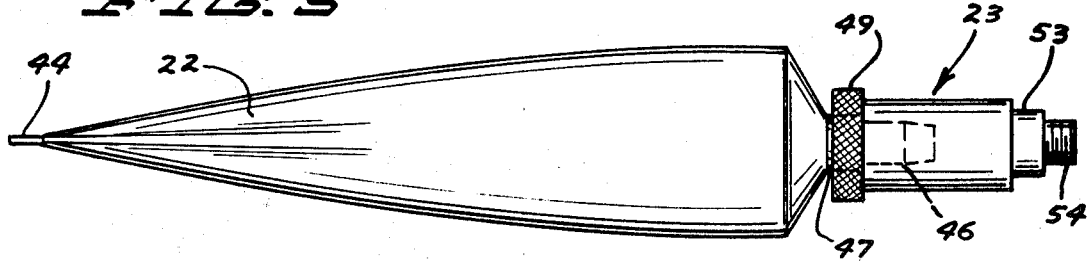
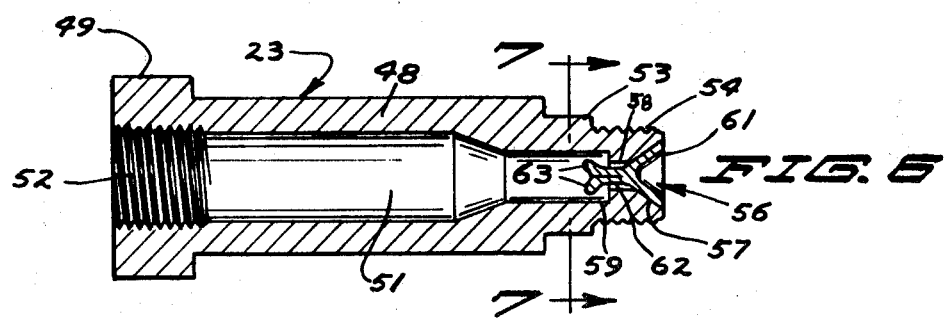
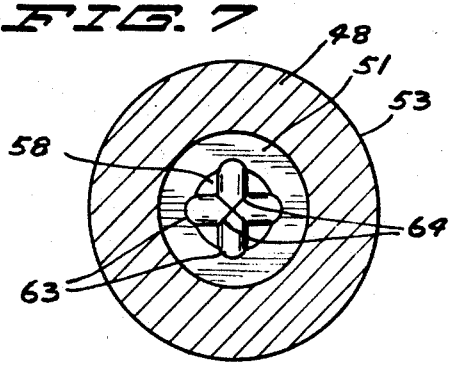
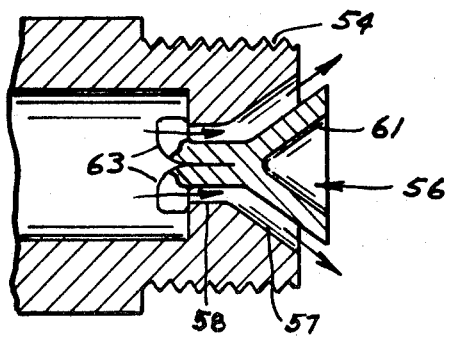
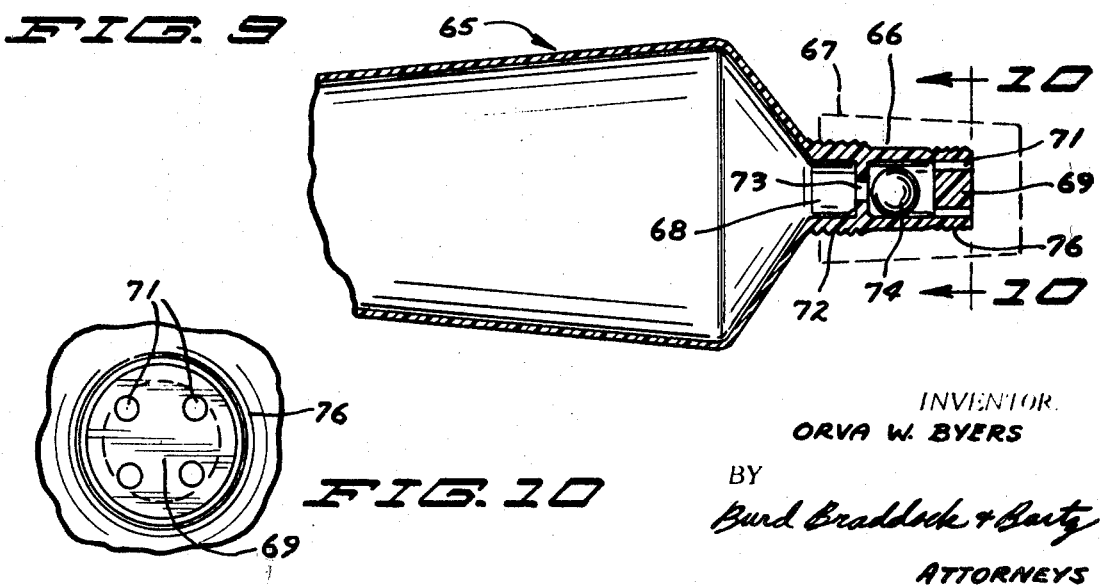
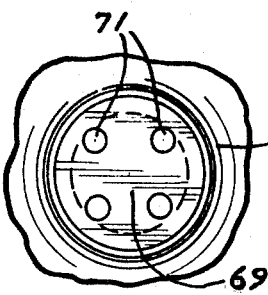
INVENTOR.
ORVA W. BYERS
BY
Burd Braddock + Bartz
ATTORNEYS United States Patent Office 3,606,090
Patented Sept. 20, 1971

3,606,090
DEVICE FOR DISPENSING MATERIAL
FROM A TUBE
Orva W. Byers, 3035 Dutch Lane, Mound, Minn. 55364
Filed July 2, 1969, Ser. No. 838,537
Int. Cl. B65d 35/28
U.S. Cl. 222—102                                   16 Claims

ABSTRACT OF THE DISCLOSURE

A device for progressively squeezing a flexible tube to inject fluid lubricant into the lower gear case of an outboard motor. The device has a frame carrying a pair of side-by-side rollers operable to squeeze a flexible walled tube. The tube has an outlet carrying an adapter threadably secured to the lower gear case of the outboard motor. Located within the adapter is a one-way cone-shaped valve operable to prevent reverse flow of lubricant from the gear case into the tube. The adapter containing the one-way valve can be an integral part of the outlet nipple of the tube.

BACKGROUND OF INVENTION

The maintenance of outboard motors require that the lower gear case be periodically filled with lubricant, as grease or heavy oil. This maintenance operation is presently being done by using a flexible tube containing the lubricant. The tube has a smooth head or nipple which is inserted into the lower inlet or filler hole and held in engagement with the gear case housing. While the nipple is maintained in engagement with the housing, the tube is squeezed by hand until the lubricant flows out of the upper vent or air bleeder hole. Considerable amount of forward or contact pressure against the filler hole must be maintained to prevent the back pressure from causing the flow of lubricant out of the filler hole. After the lubricant is in the gear case, the squeezing and contact pressures must be maintained with one hand so that the other hand can be used to insert the vent or air bleeder plug. This operation often results in loss of lubricant and loss in time in lubricating the gear case.

Larger horsepower outboard motors require one and a half to two tubes of luibricant to make a complete fill. This doubles the maintenance procedures, since two tubes must be used. Also, with the use of heavy viscose greases, considerable pressure is necessary to move the grease from the tube up into the gear case.

SUMMARY OF INVENTION

The invention broadly releates to an apparatus for dispensing a fluid into a receiver. The apparatus includes a container for storing the fluid in combination with means for connecting the container to the fluid receiver and means acting on the contanier for forcing the fluid from the container into the receiver. An adapter is used, as a coupling means, to releasably attach the container to the receiver. In one form of the invention, the adapter is provided with one-way valve means operable to permit the flow of fluid into the receiver and block the flow of fluid back into the container. The fluid can be forced from the container with a mechanical device having a pair of side-by-side rollers carried on a frame. Upon movement of the container between the rollers, the pressure of the fluid in the container is increased and forced from the container.

In another form of the invention, the container is provided with an outlet nipple which is an integral part of the container body. Located within the nipple is a one-way valve means which permits the flow of fluid out of the nipple and prevents the flow of fluid back into the nipple and container.

An object of the invention is to provide an effective and efficient structure for dispensing fluid from a collapsible container with a minimum of effort and waste of fluid. Another object of the invention is to provide a dispensing apparatus with a valve structure which prevents reverse flow of fluid, as viscose lubricants, back into the dispensing container. A further object of the invention is to provide a dispensing apparatus which is economical to manufacture and versatile in use.

IN THE DRAWINGS

FIG. 1 is a perspective view of the dispensing squeezer and adapter of the invention associated with a flexible container to discharge lubricant into the lower gear case of an outboard motor;

FIG. 2 is a side view of the right side of the dispensing squeezer;

FIG. 3 is a front end view of the dispensing squeezer taken along the line 3—3 of FIG. 2;

FIG. 4 is a side view of the left side of the dispensing squeezer;

FIG. 5 is a side view of a flexible tube carrying an adapter usable to connect the tube to the lower gear case of an outboard motor;

FIG. 6 is a longitudinal sectional view of an adapter having a return check valve;

FIG. 7 is an enlarged sectional view taken along the line 7—7 of FIG. 6;

FIG. 8 is an enlarged fragmentary sectional view of the adapter of FIG. 6 showing the check valve in the open position;

FIG. 9 is a fragmentary longitudinal sectional view of a flexible container having a discharge nipple with a return check valve; and FIG. 10 is an enlarged sectional view taken along the line 10—10 of FIG. 9.

Referring to the drawings, there is shown in FIG. 1 an outboard motor, indicated generally at 15, adapted to be mounted on the transom of a boat. The motor 15 has a lower gear case 16 carrying a rotatable propeller 17. The gear case 16 houses a conventional outboard motor power transmission gear train which must be periodically lubricated. The lower portion of gear case 16 has an inlet or filler opening 18 normally closed with a threaded plug (not shown). Located in the upper portion of the gear case 16 is an outlet or vent hole 19 normally closed with a threaded plug (not shown).

In the servicing of an outboard motor, the lower gear case is filled with a liquid-type lubricant, as heavy duty oil or grease, with a lubricant dispensing apparatus of the invention, indicated generally at 21. The apparatus 21 comprises a flexible walled container or collapsible tube 22 storing the lubricant. The container has an outlet having a passage for discharging lubricant. The container can be a flexible plastic treated paper or metal tube with the outlet located at one end of the tube. An adapter or coupling 23 is attached to the container to provide a direct connection between the tube 22 and the gear case 16. The adapter has a passageway in communication with the outlet and the gear case. A portion of the adapter 23 is releasably attached to the gear case whereby the adapter holds the container in assembled relation with the gear case. This eliminates the need for contact force on the container to hold the container outlet on the gear case. Adapter 23 is preferably a tubular metal or plastic member having internal threads at one end to attach the adapter to the container and external threads at the opposite end to attach the adapter to the gear case. The lubricant in container 22 is forced through the adapter 23 into the gear case 16 by squeezing or compressing the side walls of the container. A squeezer, indicated generally at 24, may be used to provide continuous compression forces on the side walls of the container 22 to force the lubricant through the adapter 23 into the lower gear case 16.

The squeezer 24 comprises a frame having a flat body 26 secured to a rearwardly directed linear and flat handle 27. Projected upwardly from opposite sides of body 26 are upright arms 28 and 29 rotatably carrying a pair of transverse rollers 31 and 32. The rollers 31 and 32 have end faces located close to the inside surfaces of the arms 28 and 29. The frame is made of rigid material, as metal, plastic, wood or the like. The body 26, handle 27 and arms 28 and 29 can be made from a one-piece metal blank. The arms 28 and 29 can be bent in a stamping operation upwardly relative to body 26. Rollers 31 and 32 are located in side-by-side parallel relation and have knurled outer peripheral surfaces to provide gripping traction on the tube 22. Projected axially outwardly from opposite ends of roller 31 are stub shafts 31A and 31B extended through suitable openings in the arms 28 and 29. As shown in FIG. 2, the opposite ends of roller 32 have outwardly directed stub shafts 32A and 32B projected through openings in the arms 28 and 29. Stub shafts 31A and 32A project through vertically aligned holes in the arm 29. As shown in FIG. 3, stub shafts 31B and 32B are located in an upright slot 39.

Secured to the outer end of stub shaft 31A is a torque knob 33 carrying a set screw 34 to drivably connect the knob 33 with the shaft 31A. Knob 33 carries an elongated torque rod 36 slidably disposed in a transverse hole 37. The torque rod 36 is used to rotate the knob 33 in the direction of the arrow 38 to turn the roller 31 in a clockwise direction. The rotation of roller 31 feeds the end 44 of the container between the rollers 31 and 32.

Returning to FIG. 3, the upper end of the slot 39 is closed with a projection 41 which permits the rollers 31 and 32 to move along the slot to accommodate various thicknesses of the tube or container 22. The rollers are held in side-by-side surface contact with a clip spring 42 having a bent or curved mid-portion which biases the rollers toward each other. As shown in FIGS. 2 and 3, the spring 42 is hooked over the shaft 31B and 32B.

In use, the adapter 23 is threaded onto the forward end of the container 22 and threaded into the inlet opening 18 to couple the container to the lower gear case 16. The squeezer 24 is positioned adjacent the end 44 of the container 22 with the end 44 located at the area or mouth 43 between the rollers 31 and 32. Turning the torque arm 36 in the direction of the arrow 38 rotates the roller 31 up onto the end of the container 22 to move the remainder of the squeezer, including the bottom roller 32, longitudinally along the container 22. The handle 27 is used to steer and steady the container and provide a reaction arm to counterbalance the force supplied through the torque rod 26. The squeezing pressure on the container 22 is continuously applied to inject the lubricant into the gear case until the lubricant flows out of the outlet or vent hole 19. When the gear case is full of lubricant, the vent plug is replaced in the opening or hole 19 and the adapter 23 is removed from the inlet 18. The inlet plug is then replaced to confine the lubricant to the gear case.

As shown in FIG. 5, the container 22 is an elongated flexible walled tube of plastic or metal having a transversed sealed lower end 44 opposite the forward or head end having a forwardly directed outlet nipple 46. The base 47 of the nipple is threaded to receive the cap (not shown) for the container. Threadably mounted on the base 47 is the adapter 23 used to connect the container 22 to the lower gear case 16, as shown in FIG. 1.

Referring to FIG. 6, adapter 23 has an elongated cylindrical body or housing 48 having an enlarged base or hub 49. Extended through the body 48 is a longitudinal bore or passage 51 providing a path for the movement of the lubricant through the adapter. The hub end of the body 48 has internal threads 52 compatible with the threads on the threaded base 47 so that the adapter can be threadably mounted on the base 47 in a manner so that the lubricant cannot flow past the base 47. The upper or outer end of body 48 has a reduced diameter circular neck 53 of a size to fit into the recessed hole in gear case 16 leading to the threaded inlet passage 18. Extended outwardly from neck 53 is a reduced diameter threaded end 54 having a size and thread configuration adapted to be compatible with the threads of the inlet 18.

A one-way check valve, indicated generally at 56, is located in the body to block the passage 51 to prevent the reverse flow of lubricant back into the tube or container 22. The valve 56 is a centro-linear valve located in a cone-shaped recess 57 in communication with the passage 51 through a passage 58. Passage 58 has a transverse size smaller than the diameter of passage 51 and connects passage 51 with the recess 57. Surrounding passage 58 is an annular inwardly directed shoulder 59 which functions as a stop to hold the valve in assembled relation with the body 48.

As shown in FIGS. 6 and 8, valve 56 has a cone-shaped head 61 having an outer peripheral surface which is complementary to the face of the cone-shaped recess 57. Longitudinally secured to the apex of the head 61 is a trunk or stem 62 terminating in laterally and outwardly directed fingers 63. The fingers, as well as portions of the trunk, are separated from each other by longitudinal slits 64 which allow the fingers to deform relative to each other so that the valve 56 can be assembled in the end of the body 48. As shown in FIGS. 7 and 8, the trunk has a transverse size which is smaller than the passage 58 so that the lubricant is free to flow through the passage 58 when the valve is open. The fingers 63 located in passage 51 extend beyond the side wall of passage 58 and engage the shoulder 59. As shown in FIG. 7, the lubricant is free to move between the fingers through the passage 58 and out of the body 48. With a reduction of pressure on the lubricant in the container 22, a small reverse flow or pressure on the outside of the cone head 61 causes the valve 56 to move to the closed position as shown in FIG. 6. In closed position, the head 61 seats in the cone-shaped recess 57 preventing reverse flow of lubricant back into the adapter 23 and container 22.

Referring to FIGS. 9 and 10, there is shown a modification of the container 22 and adapter 23. The container, indicated generally at 65, is a flexible walled tube for storing fluid-type lubricant, as heavy duty oil and grease. The container 65 has a head end with a forwardly directed discharge nipple 66 for receiving a cap 67. Located longitudinally through the nipple 66 is a passageway 68. The outer end of the passageway 68 is closed with an end 69 having a plurality of discharge openings or holes 71. Located in an intermediate portion of the passageway 68, and spaced from the end 69, is a transverse wall 72 having a center hole 73. Located between the wall 72 and the end 69 is a ball-type check valve 74 operable to close the hole 73 to prevent the reverse or retro-flow of lubricant back into the tube 65. The ball 74 does not function to block the flow of lubricant out of holes 71. The outer end of nipple 66 has a threaded portion 76 having a thread type and diameter compatible with a thread type and diameter of the inlet 18 of the lower gear case 16. In this manner, the nipple 66 may be threaded directly to the lower gear case 16 without the use of an intermediate adapter 23. The retro-check valve 74, being located in the nipple, will permit the forward flow of lubricant through the nipple into the gear case 16. A small amount of reverse or retro-flow of fluid through the nipple 66 will move the check valve 74 to the closed position thereby retaining the lubricant in the gear case housing. The operator can use both hands to replace the upper plug and gasket to create an air lock which holds the lubricant in the gear case until the lower plug can be replaced. The squeezer 24 can be used to continuously apply pressure to the flexible walls of the container 65 during the injection of lubricant into the gear case housing. In the alternative, hand pressure can be applied to the container 65 to force the lubricant through the nipple into the lower gear case 16.

The valve structure in nipple 66, shown as a ball valve, can be the centrum or centro-linear valve, as shown in FIGS. 6, 7, and 8. The end 69 of the nipple 66 may be formed with a cone recess for accommodating the cone head of the centrum valve. The centrum valve can be located in an intermediate part of the nipple.

The invention, described with a particular utilization and structure, is adaptable to other fluid dispensing operations without the exercise of an invention. In addition, the one-way check valve structure in the adapter and nipple may take other forms and shapes to prevent retro-flow of fluid back into the container storing the fluid. The adapter 23 may be used without the one-way valve as a coupling for joining a conventional fluid storing container to the lower gear case 16.

The embodiments of the invention in which an exclusive property or privilege is claimed are defined as follows:

1. An apparatus for dispensing fluid into a receiver having a threaded inlet hole comprising: a collapsible container for storing fluid, said container having an outlet nipple, external threads on said outlet nipple, an adapter having a body with a passage for carrying fluid from the container to the receiver, said body having at one end internal threads compatible with the external threads on the outlet nipple and at the other end external threads compatible with the threads of the inlet hole whereby the adapter connects the container to the receiver, said passage of a size and length to accommodate the nipple portion projected outwardly from said external threads, said other end having an end wall with an inwardly directed cone shaped recess connected with an opening to the passage, said wall having a shoulder facing the passage, one-way valve means associated with said end wall to permit fluid movement out of the adapter and prevent fluid from flowing back into the adapter, said valve means having a head with an outer peripheral face complementary to the cone shaped recess, said head being movable relative to the end wall to open and close the opening therein, a stem attached to the head and extended through the opening, said stem being smaller than the opening so that fluid can flow through said opening, and projection means on the inner end of the stem engageable with the shoulder to define the open position of the valve means, and means engageable with the container operable to move fluid from the container through the passage in the adapter, and the opening in the end way past said one-way valve means and into the receiver.

2. The apparatus of claim 1 wherein: said adapter has an enlarged outside hub on the body adjacent the one end of the body.

3. The apparatus of claim 1 wherein: said stem has a plurality of longitudinal members, each of said members having an outwardly directed projection.

4. The apparatus of claim 1 wherein: said adapter has a cylindrical neck adjacent the external threads on the adapter.

5. The apparatus of claim 1 wherein: the means for moving fluid from the container comprises a frame having a base, a handle secured to the base, spaced arms on opposite portions of the base, a pair of side-by-side rollers rotatably mounted on the arms, means secured to at least one of said rollers usable to rotate said one roller whereby said container is compressed and moved between said rollers to force fluid from said container.

6. An apparatus for dispensing a fluid into a receiver having a threaded inlet opening comprising: a collapsible container having an outlet nipple with an outlet passage, first external thread means on the inner portion of the nipple adapted to receive a cap to close the outlet passage, second external thread means on the outer end of said nipple to position said nipple in said threaded inlet opening and secure the nipple to said receiver, and one-way valve means in said nipple operable to permit fluid movement out of the outlet passage into the receiver and block the flow of fluid back into the nipple.

7. The apparatus of claim 6 wherein: said container is an elongated tube with said outlet nipple located at one end of the tube, said one-way valve means cooperating with an opening within the nipple to block the flow of fluid back into the tube.

8. The apparatus of claim 6 wherein: said receiver is a lower gear case of an outboard motor, said gear case having a threaded inlet opening providing a passage into the gear case, said container being a tube storing lubricant, said means on the nipple including threads adapted to turn into the threaded inlet opening whereby said tube is directly attached to the gear case, said lubricant being forced through the nipple into the gear case upon application of collapsing forces on the tube.

9. An adapter apparatus usable with a collapsible container for storing fluid having an outlet nipple to direct fluid from the container into a receiver comprising: a body having a fluid transporting passage securable to said container and receiver with the passage in communication with the outlet nipple, said body having first means adapted to secure one end of the body to the nipple and second means adapted to secure the other end of the body to a fluid receiver whereby the container is connected to the receiver so that upon collapsing of the container the fluid will flow through the passage into the receiver, said other end of the body having an end wall with an inwardly directed recess connected with an opening to the passage, said end wall having a shoulder facing the passage, one-way valve means associated with said end wall to permit fluid movement out of the opening and prevent fluid from flowing back into the opening, said valve means having a head with an outer face complementary to the recess, said head being movable relative to the end wall to open and close the opening therein, a stem attached to the head and extended through the opening, said stem being smaller than the opening so that fluid can flow through said opening, and projection means on the inner end of the stem engageable with the shoulder to define the open position of the valve means.

10. The apparatus of claim 9 wherein: said passage in the body is of a size and lengtha to accommodate the outlet nipple.

11. The apparatus of claim 9 wherein: the first means on the adapter comprise threads for securing the adapter to the container and second means comprise threads for securing the adapter to the fluid receiver.

12. The apparatus of claim 9 wherein: said adapter has a cylindrical shoulder adjacent the second means.

13. The apparatus of claim 9 including: an enlarged outside hub on the body adjacent the one end of the body.

14. The apparatus of claim 9 wherein: said stem has a plurality of longitudinal members, each of said members having an outwardly directed projection engageable with the shoulder.

15. The apparatus of claim 9 wherein: said body has a cylindrical neck adjacent the second means on the other end of the body.

16. The apparatus of claim 9 wherein: said recess has a cone shape and said valve head has a cone shape complementary to said recess.

References Cited

UNITED STATES PATENTS

| | | | |
|---|---|---|---|
| 1,710,658 | 4/1929 | George | 222—102 |
| 1,716,802 | 6/1929 | Stevenson | 222—495 |
| 1,793,787 | 2/1931 | Ertola | 222—102 |
| 1,872,837 | 8/1932 | Smith | 222—102 |
| 2,140,247 | 12/1938 | Pazdernick | 222—496 |
| 2,351,050 | 6/1944 | Karey | 103—87 |
| 3,096,915 | 7/1963 | Taylor | 222—495 |
| 3,344,963 | 10/1967 | Wynes et al. | 222—495 |
| 1,825,939 | 10/1931 | Butler | 141—386 |

FOREIGN PATENTS

| | | | |
|---|---|---|---|
| 931,126 | 9/1947 | France | 222—493 |

SAMUEL F. COLEMAN, Primary Examiner

N. L. STACK, JR., Assistant Examiner

U.S. Cl. X.R.

141—384; 103—87